(12) United States Patent
Kim (10) Patent No.: US 7,548,589 B2
(45) Date of Patent: Jun. 16, 2009

(54) METHOD AND APPARATUS FOR GENERATING WEIGHTS FOR TRANSMIT DIVERSITY IN WIRELESS COMMUNICATION

(75) Inventor: Byoung-Hoon Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 363 days.

(21) Appl. No.: 11/449,526

(22) Filed: Jun. 7, 2006

(65) Prior Publication Data

US 2006/0280257 A1 Dec. 14, 2006

Related U.S. Application Data

(60) Provisional application No. 60/690,409, filed on Jun. 13, 2005.

(51) Int. Cl.
*H04B 7/02* (2006.01)
*H04L 27/28* (2006.01)

(52) U.S. Cl. ...................................... 375/267; 375/260
(58) Field of Classification Search ................ 375/267, 375/260, 316, 347, 299; 455/101, 132
See application file for complete search history.

(56) References Cited

U.S. PATENT DOCUMENTS

| | | | |
|---|---|---|---|
| 6,801,580 B2 | 10/2004 | Kadous | |
| 6,873,606 B2 | 3/2005 | Agrawal et al. | |
| 7,212,569 B1 * | 5/2007 | Clark | ......................... 375/233 |
| 2003/0076908 A1 * | 4/2003 | Huang et al. | ................ 375/350 |
| 2006/0229051 A1 * | 10/2006 | Narayan et al. | ............. 455/296 |

OTHER PUBLICATIONS

3rd Generation Partnership Project; Technical Specification Group Radio Access Network; Physical Layer Proecedures (FDD) (Release 6), p. 51, 3GPP TS 25.214 v6.6.0 (Jun. 2005).
3rd Generation Partnership Project, "Universal Mobile Telecommunications System (UMTS); Physical layer procedures (FDD)", 3GPP TS 25.214 version 6.3.0 Release 6 (Sep. 2004).
International Search Report—PCT/US06/023118—International Search Authority, US—Mar. 13, 2007.
Written Opinion—PCT/US06/023118—International Search Authority, US—Mar. 13, 2007.
International Preliminary Report on Patentability—PCT/US06/023118—The International Bureau of WIPO, Geneva, Switzerland—Dec. 17, 2007.

* cited by examiner

*Primary Examiner*—Khai Tran
(74) *Attorney, Agent, or Firm*—Rupit M. Patel; Kenyon S. Jenckes (57) ABSTRACT

Techniques for generating weights that can provide good performance for transmit diversity are described. A receiver obtains symbols for a data transmission sent from multiple transmit antennas to at least one receive antenna. The receiver also derives channel estimates for a communication channel between the transmit antennas and the receive antenna(s). The receiver performs equalization on the symbols with an equalizer, which may be a linear equalizer or a decision feedback equalizer. The receiver derives weights for the transmit antennas based on the channel estimates and the equalizer and using, e.g., an objective function that is applicable for the equalizer and indicative of a signal-to-noise ratio (SNR) achievable by the equalizer. Different equalizers (e.g., the linear equalizer and decision feedback equalizer) may be associated with different objective functions.

20 Claims, 6 Drawing Sheets

METHOD AND APPARATUS FOR GENERATING WEIGHTS FOR TRANSMIT DIVERSITY IN WIRELESS COMMUNICATION

I. CLAIM OF PRIORITY UNDER 35 U.S.C. §119

The present Application for Patent claims priority to Provisional Application Ser. No. 60/690,409, entitled "METHOD AND APPARATUS FOR TRANSMIT DIVERSITY WEIGHT GENERATION IN WIRELESS COMMUNICATIONS," filed Jun. 13, 2005, assigned to the assignee hereof, and expressly incorporated herein by reference.

BACKGROUND

I. Field

The present disclosure relates generally to communication, and more specifically to techniques for generating weights for transmit diversity in a wireless communication system.

II. Background

In a wireless communication system, a transmitter modulates a radio frequency (RF) carrier signal with data and generates an RF modulated signal that is more suitable for transmission over a wireless channel. The transmitter then transmits the RF modulated signal via the wireless channel to a receiver. The transmitted signal may reach the receiver via a number of propagation paths. The characteristics of the propagation paths may vary over time due to various factors such as fading, multipath, interference, and so on. Consequently, the transmitted signal may experience different channel conditions and may be received with different amplitudes and phases over time.

Transmit diversity may be used to provide diversity against deleterious path effects and improve reliability. Transmit diversity utilizes multiple transmit antennas for data transmission. A propagation channel is formed between each transmit antenna and the receive antenna. If the propagation channels for different transmit antennas are linearly independent, which is generally true to at least an extent, then diversity increases and the likelihood of correctly receiving a data transmission improves as the number of transmit antennas increases.

With transmit diversity, data is redundantly sent on multiple RF modulated signals transmitted from the multiple transmit antennas to the receive antenna. The RF modulated signals typically experience different channel conditions and may be associated with different complex channel gains. Consequently, these signals may arrive at the receive antenna with different amplitudes and phases and may add constructively or destructively. A control loop may be maintained to determine the proper weights to apply to the RF modulated signals at the transmitter such that these signals add constructively at the receiver. A challenge is then how to generate the weights such that good performance can be achieved.

There is therefore a need in the art for techniques to generate weights for transmit diversity.

SUMMARY

According to an embodiment of the invention, an apparatus is described which includes at least one processor and a memory. The processor(s) obtain channel estimates for a communication channel between multiple transmit antennas and at least one receive antenna. The processor(s) derive multiple weights for the multiple transmit antennas based on the channel estimates and an equalizer used for a data transmission from the multiple transmit antennas to the receive antenna(s).

According to another embodiment, a method is provided in which channel estimates are obtained for a communication channel between multiple transmit antennas and at least one receive antenna. Multiple weights for the multiple transmit antennas are derived based on the channel estimates and an equalizer used for a data transmission from the multiple transmit antennas to the receive antenna(s).

According to yet another embodiment, an apparatus is described which includes means for obtaining channel estimates for a communication channel between multiple transmit antennas and at least one receive antenna, and means for deriving multiple weights for the multiple transmit antennas based on the channel estimates and an equalizer used for a data transmission from the multiple transmit antennas to the receive antenna(s).

According to yet another embodiment, an apparatus is described which includes at least one processor and a memory. The processor(s) obtain symbols for a data transmission sent from multiple transmit antennas to at least one receive antenna, process the symbols in the frequency domain, and derive multiple weights for the multiple transmit antennas.

According to yet another embodiment, a method is provided in which symbols are obtained for a data transmission sent from multiple transmit antennas to at least one receive antenna. The symbols are processed in the frequency domain. Multiple weights are derived for the multiple transmit antennas.

According to yet another embodiment, an apparatus is described which includes means for obtaining symbols for a data transmission sent from multiple transmit antennas to at least one receive antenna, means for processing the symbols in the frequency domain, and means for deriving multiple weights for the multiple transmit antennas.

DETAILED DESCRIPTION

The word "exemplary" is used herein to mean "serving as an example, instance, or illustration." Any embodiment described herein as "exemplary" is not necessarily to be construed as preferred or advantageous over other embodiments.

For clarity, the following nomenclature is used in much of the description below. Time-domain scalars are denoted by lower case text with index n for sample period, e.g., h(n). Frequency-domain scalars are denoted by upper case text with index k for frequency bin, e.g., H(k). Vectors are denoted by bolded lower case text, e.g., $\underline{h}$, and matrices are denoted by bolded upper case text, e.g., $\underline{H}$.

Figure 1:
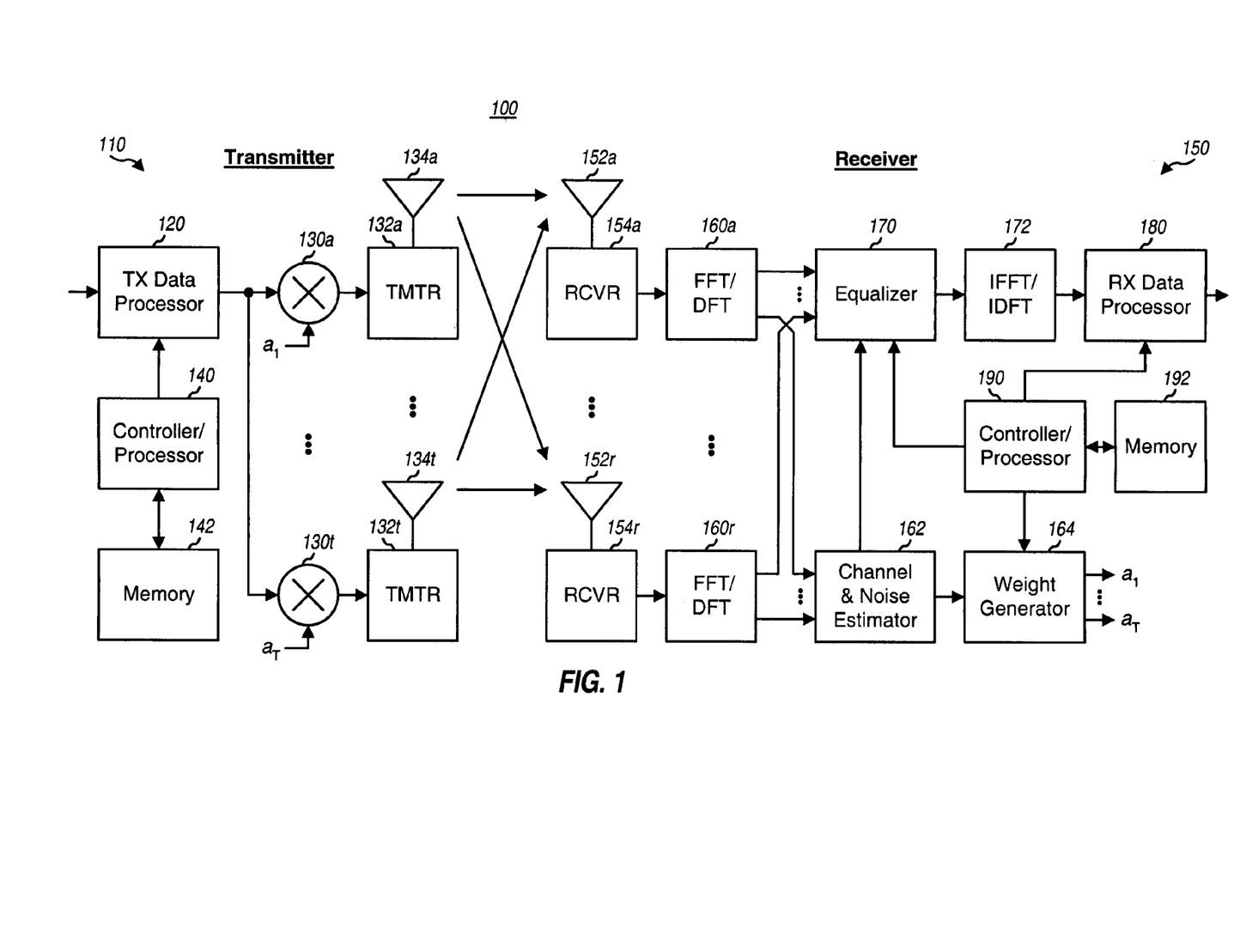
FIG. 1 shows a block diagram of a transmitter and a receiver.

FIG. 1 shows a block diagram of a transmitter 110 and a receiver 150 in a communication system 100. In the embodiment shown in FIG. 1, transmitter 110 is equipped with multiple (T) antennas 134a through 134t, and receiver 150 is equipped with one or more (R) antennas 152a through 152r, where T≧2 and R≧1. For a downlink/forward link transmission, transmitter 110 is part of a base station, and receiver 150 is part of a wireless device. For an uplink/reverse link transmission, transmitter 110 is part of a wireless device, and receiver 150 is part of a base station. A base station is typically a fixed station that communicates with the wireless devices and may also be called a Node B, an access point, and so on. A wireless device may be fixed or mobile and may also be called a user equipment (UE), a mobile station, a user terminal, a subscriber unit, and so on. A wireless device may be a cellular phone, a personal digital assistant (PDA), a wireless modem card, or some other device or apparatus.

At transmitter 110, a transmit (TX) data processor 120 processes traffic data and provides transmit chips at chip rate. The processing by processor 120 is dependent on the system and may include encoding, interleaving, symbol mapping, spreading, scrambling, and so on. T multipliers 130a through 130t receive and scale the transmit chips with weights $a_1$ through $a_T$, respectively. T transmitter units (TMTRs) 132a through 132t receive and condition (e.g., convert to analog, amplify, filter, and frequency upconvert) the scaled transmit chips from multipliers 130a through 130t, respectively. Transmitter units 132a through 132t generate T RF modulated signals that are transmitted via T antennas 134a through 134t, respectively.

At receiver 150, R antennas 152a through 152r receive the transmitted signals via various propagation paths and provide R received signals to R receiver units (RCVR) 154a through 154r, respectively. Each receiver unit 154 conditions (e.g., filters, amplifies, and frequency downconverts) its received signal, digitizes the conditioned signal at a sample rate that is equal to or higher than the chip rate, and provides time-domain input samples.

FIG. 1 shows an embodiment in which receiver 150 performs equalization in the frequency domain. In this embodiment, R fast Fourier transform/discrete Fourier transform (FFT/DFT) units 160a through 160r receive input samples from R receiver units 154a through 154r, respectively. Each unit 160 transforms its input samples to the frequency domain, provides frequency-domain input symbols for traffic data to an equalizer 170, and provides input symbols for pilot to a channel and noise estimator 162. Estimator 162 estimates the channel response and noise based on the input symbols for pilot and/or data. Equalizer 170 derives equalizer coefficients based on the channel and noise estimates as described below, filters the input symbols from all R receive antennas with the equalizer coefficients, combines the filtered symbols across space and/or frequency, and provides output symbols to an inverse FFT/inverse DFT (IFFT/IDFT) unit 172. Unit 172 transforms the output samples to the time domain and provides output samples. A receive (RX) data processor 180 processes the output samples in a manner complementary to the processing by TX data processor 120 and provides decoded data.

In general, receiver 150 may perform equalization using equalizers of various structures such as (1) a linear equalizer that performs equalization in the time or frequency domain without feedback and (2) a decision feedback equalizer (DFE) that performs equalization in the time and/or frequency domain with feedback. Different equalizer structures may be able to achieve different SNRs. A given equalizer structure (e.g., a linear equalizer or a decision feedback equalizer) may also achieve different SNRs depending on how the equalizer is implemented, as described below. A linear equalizer and a decision feedback equalizer that operate in the frequency domain are described below.

Controllers/processors 140 and 190 direct operation of various processing units at transmitter 110 and receiver 150, respectively. Memories 142 and 192 store data and program codes for transmitter 110 and receiver 150, respectively. A weight generator 164 generates the weights $a_1$ through $a_T$ for the T transmit antennas based on the channel and noise estimates and the equalizer used at the receiver, as described below. Although not shown in FIG. 1, the transmit antenna weights $a_1$ through $a_T$ may be sent back to transmitter 110 and applied to the transmit chips by multipliers 130a through 130t prior to transmission via antennas 134a through 134t.

A communication channel between the T antennas at transmitter 110 and the R antennas at receiver 150 is composed of T·R single-input single-output (SISO) channels, one SISO channel for each transmit/receive antenna pair. Each SISO channel may be characterized by either a time-domain channel impulse response h(n) or a frequency-domain channel frequency response H(k).

A time-domain representation may be converted to a frequency-domain representation with a K-point FFT or a K-point DFT, which may be expressed as:

$$H(k) = \sum_{n=1}^{K} h(n) \cdot e^{-j2\pi(k-1)(n-1)/K}, \qquad \text{Eq (1)}$$

where the "−1" in the exponent is due to indices n and k starting with 1 instead of 0.

A frequency-domain representation may be converted to a time-domain representation with a K-point IFFT or a K-point IDFT, which may be expressed as:

$$h(n) = \frac{1}{K} \cdot \sum_{k=1}^{K} H(k) \cdot e^{j2\pi(k-1)(n-1)/K}. \qquad \text{Eq (2)}$$

Figure 2:
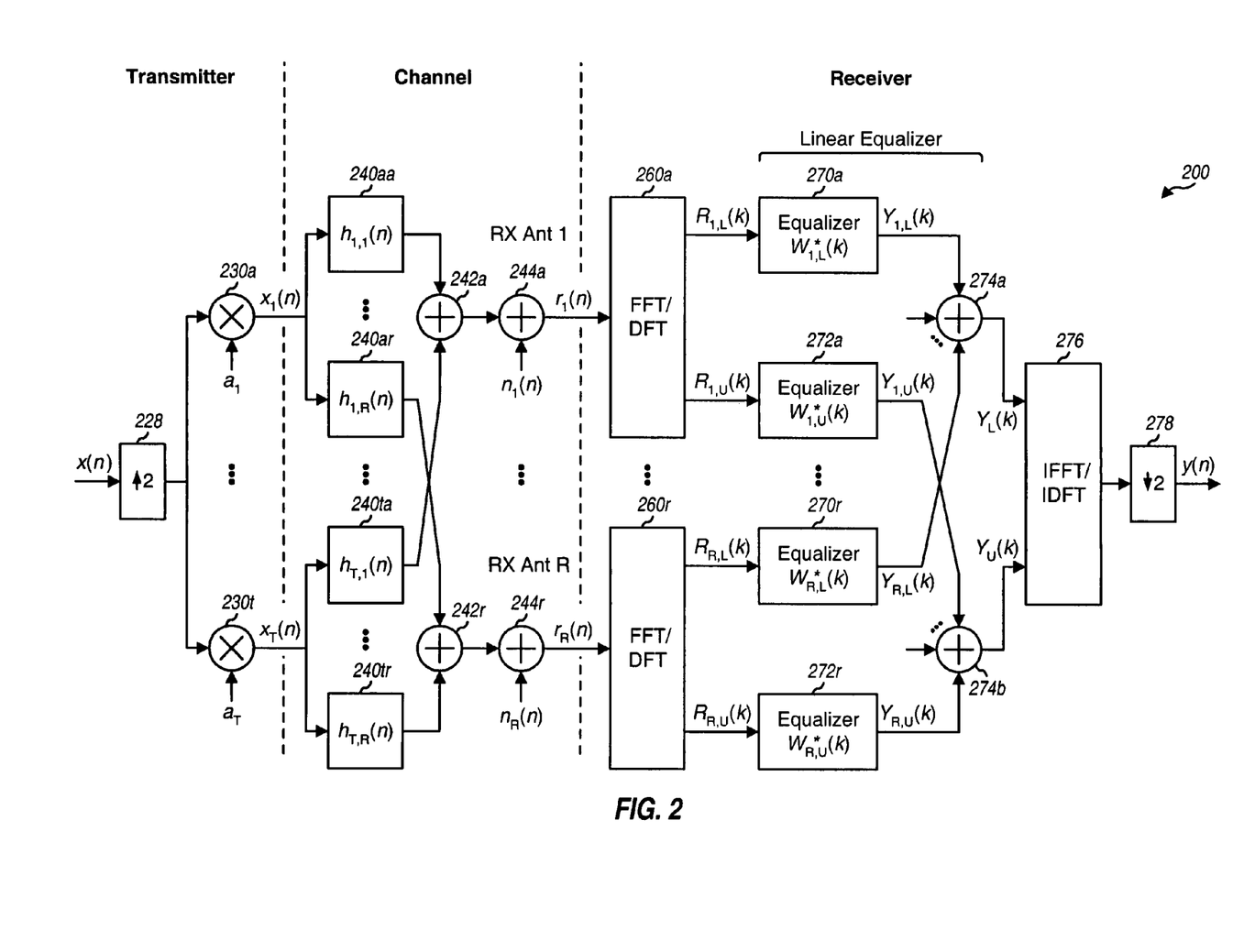
FIG. 2 shows a signal flow for transmission from the transmitter to the receiver.

FIG. 2 shows a signal flow 200 for a data transmission from transmitter 110 to receiver 150. FIG. 2 shows an embodiment with two times (2×) oversampling of the received signal from each receive antenna. FIG. 2 also shows the use of a fractionally-spaced linear equalizer that performs equalization in the frequency domain. The term "fractionally-spaced" refers to sampling at a higher rate than the rate required by Nyquist sampling theorem.

The transmitter processes traffic data and generates transmit chips x(n) at the chip rate. The transmitter may append a cyclic prefix to each block of K/2 transmit chips. A cyclic prefix is a repeated portion of a data block and is used to combat intersymbol interference (ISI) caused by frequency selective fading, which is a frequency response that is not flat across the system bandwidth. In an actual system, the transmitter sends the transmit chip sequence to the receiver. For signal flow 200, an upsampler 228 inserts a zero after each transmit chip and provides transmit samples at the sample rate, which is twice the chip rate for 2× oversampling. T multipliers 230a through 230t scale the transmit samples with weights $a_1$ through $a_T$, respectively, and provide scaled transmit samples $x_1(n)$ through $x_T(n)$, respectively, for the T transmit antennas.

The scaled transmit samples are sent from the T transmit antennas and via the communication channel to the R receive antennas. The communication channel is composed of T·R SISO channels that are modeled by blocks 240aa through 240tr. The SISO channel between transmit antenna t and receive antenna r is modeled by a channel impulse response of $h_{t,r}(n)$, which includes the effects of the pulse shaping filter at the transmitter, the propagation channel, the front-end filter at the receiver, and so on. For the first receive antenna, a summer 242a sums the outputs of blocks 240aa through 240ta, and a summer 244a sums the output of summer 242a with additive noise of $n_1(n)$. The SISO channels for each of the other receive antennas, if any, are combined and added with noise in similar manner as the first receive antenna.

Figure 3:
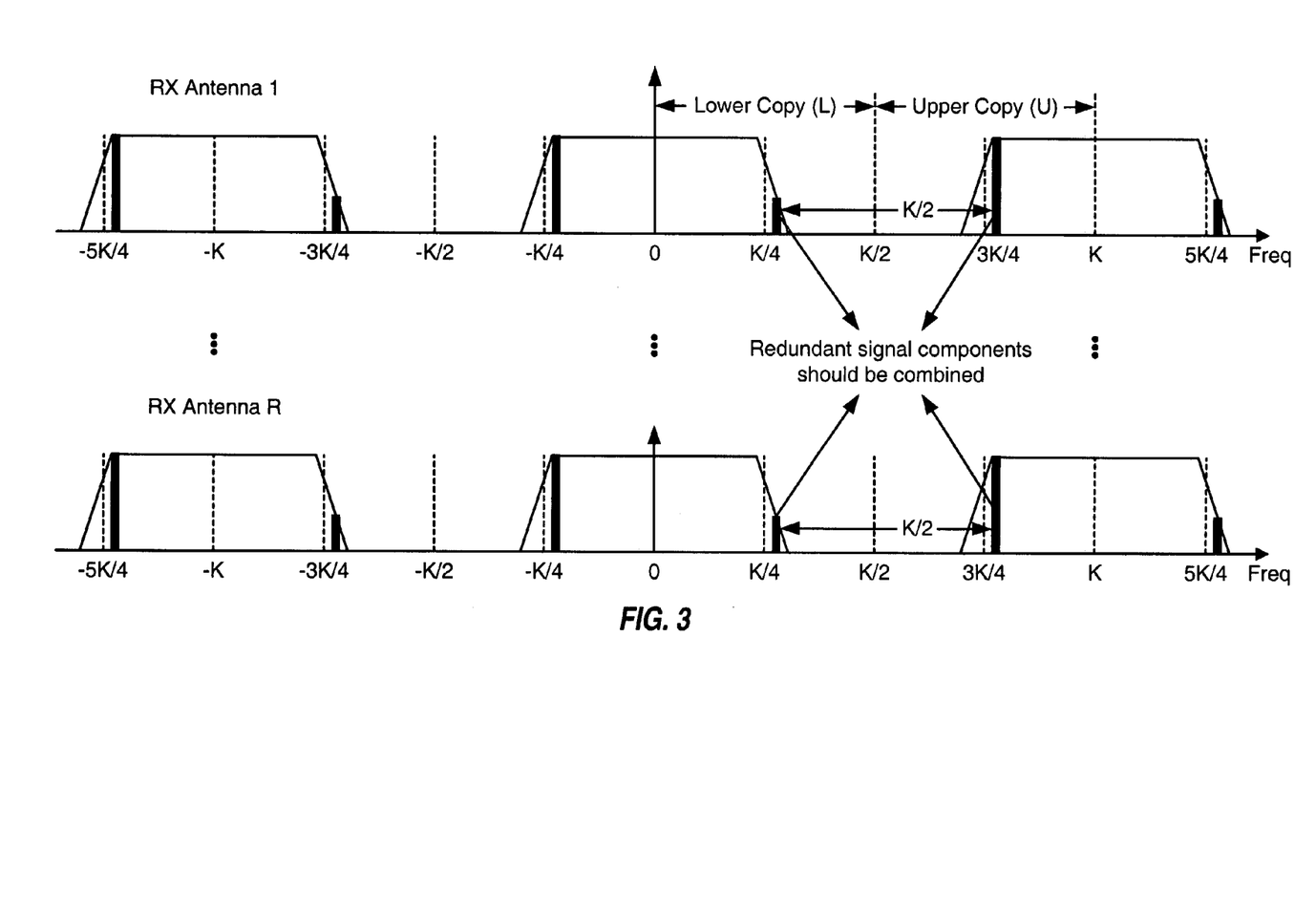
FIG. 3 shows spectral plots for R receive antennas with 2× oversampling.

Receiver 150 digitizes the received signal from each receive antenna at twice the chip rate and obtains input samples at the sample rate (not shown in FIG. 2). The receiver may remove the cyclic prefix, if any, appended in each data block by the transmitter. The time-domain input samples $r_1(n)$ from the first receive antenna are transformed to the frequency domain with a K-point FFT/DFT by a unit 260a to obtain frequency-domain input symbols $R_1(k)$, for k=1, ..., K. The 2× oversampling results in two copies of the signal spectrum being available for each receive antenna, as shown in FIG. 3 below. The two redundant signal copies in the oversampled spectrum for each receive antenna are referred to as a lower copy (L) and an upper copy (U). A signal copy may also be referred to as a spectral copy or by some other terminology. The first K/2 input symbols $R_1(k)$, for k=, ..., K/2, are for the lower copy, are denoted as $R_{1,L}(k)$, for k=1, ..., K/2, and are provided to an equalizer 270a. The last K/2 input symbols $R_1(k)$, for k=K/2+1, ..., K, are for the upper copy, are denoted as $R_{1,U}(k)$, for k=1, ..., K/2, and are provided to an equalizer 272a. The input samples for the other receive antennas, if any, are processed in similar manner as the input samples for the first receive antenna.

Each of equalizers 270 and 272 filters its input symbols $R_{r,c}(k)$ with its coefficients $W_{r,c}^*(k)$ and provides filtered symbols $Y_{r,c}(k)$, where r=1, ..., R is an index for receive antenna and c∈{L, U} is an index for signal copy. A summer 274a sums the filtered symbols $Y_{1,L}(k)$ through $Y_{R,L}(k)$ from equalizers 270a through 270r, respectively, and provides output symbols $Y_L(k)$ for the lower copy. A summer 274b sums the filtered symbols $Y_{1,U}(k)$ through $Y_{R,U}(k)$ from equalizers 272a through 272r, respectively, and provides output symbols $Y_U(k)$ for the upper copy. A unit 276 performs a K-point IFFT/IDFT on the output symbols $Y_L(k)$ and $Y_U(k)$ and provides output samples at the sample rate. A downsampler 278 discards every other output sample and provides output samples y(n) at the chip rate.

FIG. 3 shows exemplary spectral plots for the R receive antennas with 2× oversampling. The transmit chips x(n) are at the chip rate of $f_c$. The corresponding spectrum has a bandwidth of $f_c/2$ and a roll-off determined by the pulse shaping filter at the transmitter. The received signal from each receive antenna is digitized at the sample rate of $f_s$, which is twice the chip rate, or $f_s=2f_c$. For each receive antenna, the lower copy covers a frequency range of DC to $f_s/2$, which corresponds to bin indices k=1 through K/2, and the upper copy covers a frequency range of $f_s/2$ to $f_s$, which corresponds to bin indices k=K/2+1 through K. For simplicity, FIG. 3 shows similar spectral plots for the R receive antennas. In general, the spectral plot for each receive antenna r has a shape determined by the frequency response $H_r(k)$ for that antenna.

As shown in FIG. 3, the receiver obtains 2 R signal copies from a redundancy factor of R from the R receive antennas and a redundancy factor of two from the 2× oversampling. FIG. 3 also shows how redundant signal components in the 2 R signal copies should be combined. The two redundant signal components for each receive antennas are separated by a distance of $f_s/2$ or K/2 frequency bins.

A space-frequency equalizer may be used for each frequency bin k, for k=1, ..., K/2. The space-frequency equalizer for frequency bin k may combine the redundant signal components on bins k and k+K/2 for all R receive antennas. For clarity, the processing for one frequency bin k is described below. The same processing may be performed for each of the K/2 frequency bins, or for k=1, ..., K/2.

Figure 4:
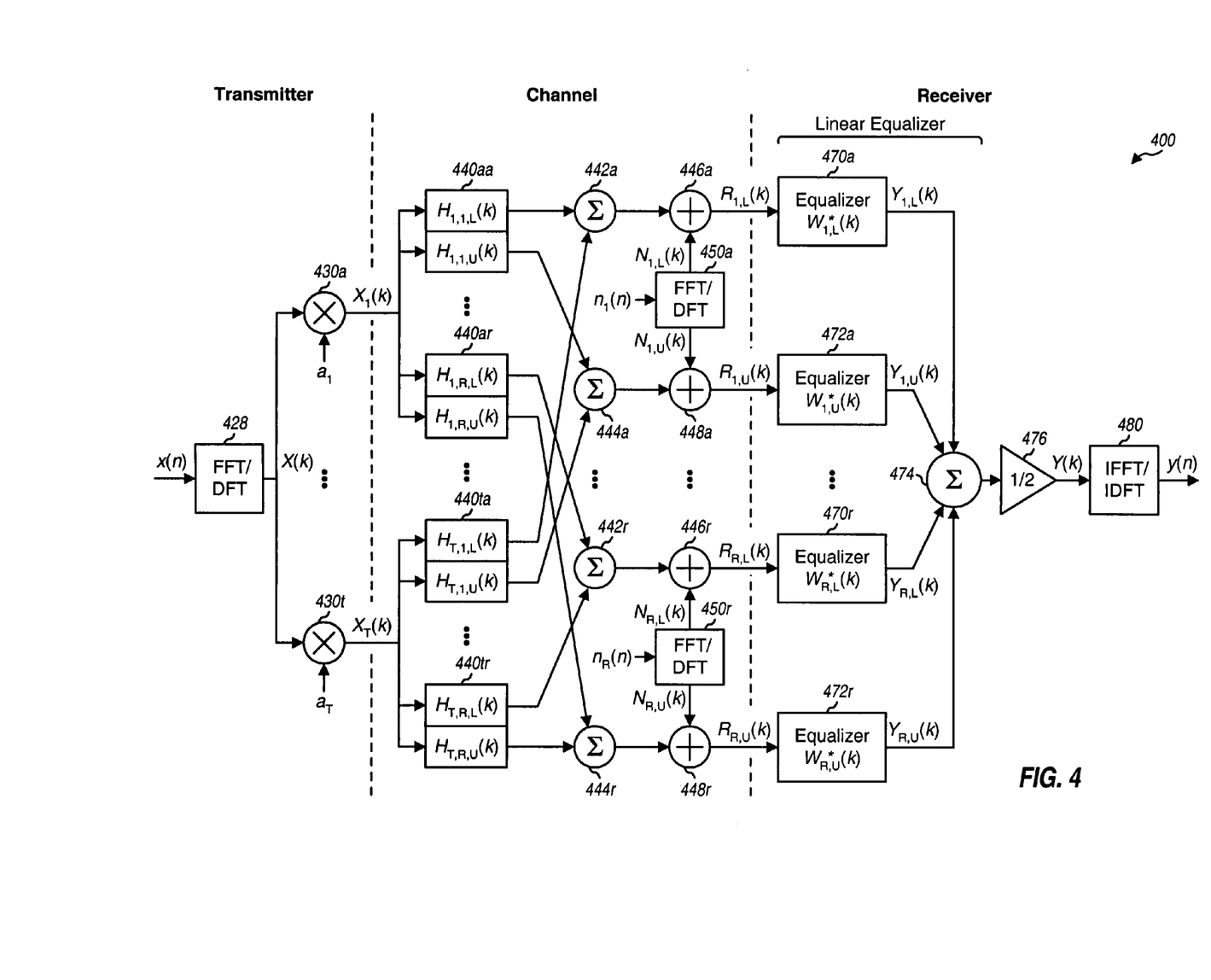
FIG. 4 shows a signal flow for a fractionally-spaced linear equalizer.

FIG. 4 shows a frequency-domain signal flow 400 for a fractionally-spaced linear equalizer. Signal flow 400 is equivalent to signal flow 200 in FIG. 2 and is for the case with 2× oversampling.

The transmitter processes traffic data and generates transmit chips x(n) at the chip rate. In an actual system, the transmitter sends the transmit chip sequence to the receiver and does not perform any FFT/DFT. However, for signal flow 400, a unit 428 performs a K/2-point FFT/DFT on the transmit chips and provides frequency-domain transmit symbols X(k), for k=1, ..., K/2. T multipliers 430a through 430t scale the transmit symbols X(k) with weights $a_1$ through $a_T$, respectively, and provide scaled transmit symbols $X_1(k)$ through $X_T(k)$, respectively, for the T transmit antennas.

The scaled transmit symbols $X_1(k)$ through $X_T(k)$ are sent from the T transmit antennas and via the communication channel to the R receive antennas. The SISO channel between transmit antenna t and receive antenna r is modeled by a frequency response of $H_{t,r,L}(k)$ for the lower copy and a frequency response of $H_{t,r,U}(k)$ for the upper copy. For the first receive antenna, a summer 442a sums the outputs of blocks 440aa through 440ta for the lower copy. A summer 446a sums the output of summer 442a with additive noise of $N_{1,L}(k)$ and provides received symbols $R_{1,L}(k)$ for the lower copy. A summer 444a sums the outputs of blocks 440aa through 440ta for the upper copy. A summer 448a sums the output of summer 444a with additive noise of $N_{1,U}(k)$ and provides received symbols $R_{1,U}(k)$ for the upper copy. A unit 450a transforms time-domain noise $n_1(n)$ and provides frequency-domain noise $N_{1,L}(k)$ and $N_{1,U}(k)$ for the lower and upper copies, respectively. The SISO channels and noise for the other receive antennas, if any, are modeled in similar manner.

At receiver 150, equalizer 470a and 472a receive frequency-domain input symbols $R_{1,L}(k)$ and $R_{1,U}(k)$ for the lower and upper copies for the first receive antenna. The equalizers for other receive antennas, if any, similarly receive input symbols for their antennas. Each of equalizers 470 and 472 filters its input symbols $R_{r,c}(k)$ with its coefficients $W_{r,c}^*(k)$ and provides filtered symbols $Y_{r,c}(k)$. A summer 474 sums the filtered symbols $Y_{1,L}(k)$ and $Y_{1,U}(k)$ through $Y_{R,L}(k)$ and $Y_{R,U}(k)$ from all 2 R equalizers 470 and 472. A gain element 476 scales the output of summer 474 with a gain of ½ and provides output symbols Y(k). A unit 480 performs a K/2-point IFFT/IDFT on the output symbols Y(k) and provides time-domain output samples y(n) at the chip rate.

In comparing signal flows 200 and 400, the 2× upsampling of the transmit chips x(n) by upsampler 228 in FIG. 2 followed by a K-point FFT/DFT is equivalent to performing a K/2-point FFT/DFT on x(n) by unit 428 in FIG. 4 and duplicating X(k) for the lower and upper copies. Adding $Y_{1,L}(k)$ through $Y_{R,L}(k)$ by summer 274a, adding $Y_{1,U}(k)$ through $Y_{R,U}(k)$ by summer 274b, and performing a K-point IFFT/IDFT by unit 276 followed by decimation by a factor of two by decimator 278 in FIG. 2 is equivalent to adding $Y_{1,L}(k)$ and $Y_{1,U}(k)$ through $Y_{R,L}(k)$ and $Y_{R,U}(k)$ by summer 474, scaling by ½ with unit 476, and performing a K/2-point IFFT/IDFT by unit 480 in FIG. 4.

For signal flow 400, the frequency-domain input symbols at the receiver may be expressed as:

$$\underline{r}(k) = \sum_{t=1}^{T} \underline{h}_t(k) \cdot a_t \cdot X(k) + \underline{n}(k), \quad \text{Eq (3)}$$
$$= \underline{H}(k) \cdot \underline{a} \cdot X(k) + \underline{n}(k),$$
$$= \underline{h}_{\mathit{eff}}(k) \cdot X(k) + \underline{n}(k),$$

where $\underline{r}(k)=[R_{1,L}(k) \ldots R_{R,L}(k)\, R_{1,U}(k) \ldots R_{R,U}(k)]^T$ is a 2 R×1 vector of input symbols, $\underline{h}_t(k)=[H_{t,1,L}(k) \ldots H_{t,R,L}(k)\, H_{t,1,U}(k) \ldots H_{t,R,U}(k)]^T$ is a 2 R×1 vector of channel gains for transmit antenna t, for t ∈ {1, ..., T}, $\underline{H}(k)=[\underline{h}_1(k) \ldots \underline{h}_T(k)]$ is a 2 R×T channel response matrix, $\underline{a}=[a_1 \ldots a_T]^T$ is a T×1 vector of weights for the T transmit antennas, $\underline{h}_{\mathit{eff}}(k)=\underline{H}(k)\cdot\underline{a}$ is a 2 R×1 effective channel response vector, $\underline{n}(k)=[N_{1,L}(k) \ldots N_{R,L}(k)\, N_{1,U}(k) \ldots N_{R,U}(k)]^T$ is a 2 R×1 noise vector, and "$T$" a denotes a transpose.

The lower and upper copies for each receive antenna are denoted by subscripts L and U, respectively, and are separated by K/2 frequency bins, as shown in FIG. 3.

A linear equalizer may be implemented based on minimum mean square error (MMSE), zero-forcing (ZF), maximal ratio combining (MRC), or some other detection technique. The coefficients for a linear MMSE equalizer may be expressed as:

$$\underline{w}^H(k) = S(k) \cdot \underline{h}_{\mathit{eff}}^H(k) \cdot [S(k) \cdot \underline{h}_{\mathit{eff}}(k) \cdot \underline{h}_{\mathit{eff}}^H(k) + \underline{R}(k)]^{-1}, \quad \text{Eq (4)}$$

where $S(k)=E\{|X(k)|^2\}$ is the power spectrum of the transmit chips x(n), $\underline{R}(k)=E\{\underline{n}(k)\cdot\underline{n}^H(k)\}$ is a 2 R×2 R noise covariance matrix, $\underline{w}^H(k)=[W_{1,L}^*(k) \ldots W_{R,L}^*(k)\, W_{1,U}^*(k) \ldots W_{R,U}^*(k)]$ is a 1×2R row vector of equalizer coefficients for frequency bin k, and "$H$" denotes a conjugate transpose.

Equation (4) minimizes the variance of the output error of the linear equalizer.

The matrix inversion lemma may be applied to equation (4). The equalizer coefficients may then be expressed as:

$$\underline{w}^H(k) = \frac{S(k)}{1 + S(k)\cdot \underline{h}_{\mathit{eff}}^H(k) \cdot \underline{R}^{-1}(k) \cdot \underline{h}_{\mathit{eff}}(k)} \cdot \underline{h}_{\mathit{eff}}^H(k) \cdot \underline{R}^{-1}(k), \quad \text{Eq (5)}$$
$$= \frac{S(k)}{1 + S(k)\cdot \underline{a}^H \cdot \underline{H}^H(k) \cdot \underline{R}^{-1}(k) \cdot \underline{H}(k) \cdot \underline{a}} \cdot \underline{a}^H \cdot \underline{H}^H(k) \cdot \underline{R}^{-1}(k).$$

Equation (5) has a 2 R×2 R matrix inversion for $\underline{R}^{-1}(k)$ for each frequency bin k. Equation (5) may be simplified if the lower and upper copies of the oversampled spectrum have uncorrelated noise or negligible noise correlation. In this case, the noise covariance matrix may be given as $$\underline{R}(k) = \begin{bmatrix} \underline{R}_L(k) & 0 \\ 0 & \underline{R}_U(k) \end{bmatrix},$$

where $\underline{R}_L(k)$ is an R×R noise covariance matrix for the lower copy and $\underline{R}_U(k)$ is an R×R noise covariance matrix for the upper copy. Equation (5) may be further simplified if the noise is spatially and spectrally uncorrelated with a common variance within each frequency bin. In this case, the noise covariance matrix may be given as $\underline{R}(k)=\sigma^2(k)\cdot\underline{I}$, where $\sigma^2(k)$ is the variance of the noise and $\underline{I}$ is the identity matrix.

The frequency-domain output symbols from the linear equalizer may be expressed as:

$$Y(k) = \underline{w}^H(k)\cdot \underline{r}(k), \quad \text{Eq (6)}$$
$$= \underline{w}^H(k)\underline{h}_{\mathit{eff}}(k)\cdot X(k) + \underline{w}^H(k)\cdot\underline{n}(k),$$
$$= X(k) + [B(k)-1]\cdot X(k) + V(k),$$
$$= X(k) + \Psi(k),$$

where $B(k)=\underline{w}^H(k)\cdot\underline{h}_{\mathit{eff}}(k)$ is a scaling for X(k), $V(k)=\underline{w}^H(k)\cdot\underline{n}(k)$ is filtered noise for X(k), and $\Psi(k)=[B(k)-1]\cdot X(k)+V(k)$ is the residual error and noise.

The variance of V(k) may be expressed as:

$$\sigma_v^2(k) = E\{|V(k)|^2\}, \quad \text{Eq (7)}$$
$$= \underline{w}^H(k)\cdot \underline{R}(k)\cdot \underline{w}(k),$$
$$= \frac{\underline{a}^H \cdot S^2(k) \cdot \underline{H}^H(k) \cdot \underline{R}^{-1}(k) \cdot \underline{H}(k) \cdot \underline{a}}{[1 + \underline{a}^H \cdot S(k) \cdot \underline{H}^H(k) \cdot \underline{R}^{-1}(k) \cdot \underline{H}(k) \cdot \underline{a}]^2}.$$

The variance of $\Psi(k)$ may be expressed as:

$$\sigma_\Psi^2(k) = E\{|\Psi(k)|^2\}, \quad \text{Eq (8)}$$
$$= |B(k)-1|^2 \cdot S(k) + \sigma_v^2(k),$$
$$= \frac{S(k)}{1 + S(k)\cdot \underline{a}^H \cdot \underline{\Omega}(k) \cdot \underline{a}},$$

where $$\underline{\Omega}(k) = \underline{H}^H(k) \cdot \underline{R}^{-1}(k) \cdot \underline{H}(k),$$
$$= \begin{bmatrix} \underline{h}_1^H(k)\cdot\underline{R}^{-1}(k)\cdot\underline{h}_1(k) & \cdots & \underline{h}_1^H(k)\cdot\underline{R}^{-1}(k)\cdot\underline{h}_T(k) \\ \vdots & \ddots & \vdots \\ \underline{h}_T^H(k)\cdot\underline{R}^{-1}(k)\cdot\underline{h}_1(k) & \cdots & \underline{h}_T^H(k)\cdot\underline{R}^{-1}(k)\cdot\underline{h}_T(k) \end{bmatrix}.$$

The frequency-domain output symbols may be transformed to the time domain with an IFFT/IDFT to obtain time-domain output samples, which may be expressed as:

$$y(n) = b(n) \otimes x(n) + v(n), \quad \text{Eq (9)}$$

-continued $$= x(n) + \psi(n),$$

where y(n), x(n), b(n), v(n) and ψ(n) are time-domain representations of Y(k), X(k), B(k), V(k), and Ψ(k), respectively, and x̂ denotes a convolution operation.

Equations (6) and (9) provide biased MMSE estimates of X(k) and x(n), respectively. The output symbols Y(k) or the output samples y(n) may be multiplied with a scaling factor F to obtain unbiased estimates. The scaling factor F may be given as:

$$F = \left[\frac{1}{K/2} \cdot \sum_{k=1}^{K/2} B(k)\right]^{-1}. \quad \text{Eq (10)}$$

The variance of ψ(n) may be expressed as:

$$\sigma_\psi^2 = E\{|\psi(n)|^2\}, \quad \text{Eq (11)}$$

$$= \frac{1}{K^2/4} \cdot \sum_{k=1}^{K/2} \frac{S(k)}{1 + S(k) \cdot \underline{a}^H \cdot \underline{\Omega}(k) \cdot \underline{a}}.$$

The SNR of the chip-rate output samples y(n), before the unbiasing operation, may be expressed as:

$$SNR_{chip}^{biased} = \frac{E\{|x(n)|^2\}}{E\{|\psi(n)|^2\}} = \frac{\frac{1}{K^2/4} \cdot \sum_{k=1}^{K/2} S(k)}{\frac{1}{K^2/4} \cdot \sum_{k=1}^{K/2} \frac{S(k)}{1 + S(k) \cdot \underline{a}^H \cdot \underline{\Omega}(k) \cdot \underline{a}}}. \quad \text{Eq (12)}$$

The chip SNR after the unbiasing operation may be expressed as:

$$SNR_{chip}^{unbiased} = SNR_{chip}^{biased} - 1. \quad \text{Eq (13)}$$

Since the unbiased chip SNR is related to the biased chip SNR by a constant, maximizing the unbiased chip SNR is equivalent to maximizing the biased chip SNR.

The transmit chips x(n) may be assumed to be uncorrelated or white. In this case, S(k) is equal to a constant power spectral density $S_x$, or $S(k)=S_x$ for $k=1, 2, \ldots, K/2$.

An SNR metric may be defined based on the chip SNR in equation (12), as follows:

$$SNR_h = \frac{\frac{S_x}{K/2}}{\frac{1}{K^2/4} \cdot \sum_{k=1}^{K/2} \frac{S_x}{1 + S_x \cdot \underline{a}^H \cdot \underline{\Omega}(k) \cdot \underline{a}}} = \quad \text{Eq (14)}$$

$$\frac{1}{\frac{1}{K/2} \cdot \sum_{k=1}^{K/2} \frac{1}{1 + S_x \cdot \underline{a}^H \cdot \underline{\Omega}(k) \cdot \underline{a}}}.$$

The SNR metric in equation (14) is a harmonic mean of the term $[1+S_x \cdot \underline{a}^H \cdot \underline{\Omega}(k) \cdot \underline{a}]$ for K/2 frequency bins. The harmonic mean of $g_1, g_2, \ldots, g_K$ is given as:

$$\frac{K}{\frac{1}{g_1} + \frac{1}{g_2} + \ldots + \frac{1}{g_K}}.$$

The harmonic mean is an average of the SNR values corresponding to the K/2 frequency bins.

The chip SNR in equation (14) may be maximized with respect to the transmit weight vector a by minimizing the denominator, which is:

$$D(\underline{a}) = \frac{1}{K/2} \cdot \sum_{k=1}^{K/2} \frac{1}{1 + S_x \cdot \underline{a}^H \cdot \underline{\Omega}(k) \cdot \underline{a}}. \quad \text{Eq (15)}$$

The minimization of the denominator may be under a constraint of unit norm for the transmit weight vector, which is $|\underline{a}|^2=1$. Vector a may also be defined such that the first element is fixed (e.g., $a_1=(1+j0)/\sqrt{T}$) and only the phase angle of each element of the transmit weight vector is allowed to be optimized.

An objective function may be defined for D(a) as follows:

$$J_h(\underline{a}) = \sum_{k=1}^{K/2} \frac{1}{1 + S_x \cdot \underline{a}^H \cdot \underline{\Omega}(k) \cdot \underline{a}} + \lambda \cdot (\underline{a}^H \cdot \underline{a} - 1), \quad \text{Eq (16)}$$

where λ is a Lagrange multiplier, and $J_h(\underline{a})$ is an objective function for the chip SNR shown in equation (14).

Minimizing the denominator D(a) in equation (15) with the constraint of $|\underline{a}|^2=1$ is equivalent to minimizing the objective function $J_h(\underline{a})$ in equation (16).

A solution that yields a minimum value for the objective function $J_h(\underline{a})$ may be obtained by (1) taking the derivative of $J_h(\underline{a})$ with respect to $\underline{a}^*$ and λ and (2) setting the derivative to zero. However, a closed form solution may not be available for the derivative. Furthermore, a finite set of choices for the transmit antenna weights may be available for use. Hence, equation (15) may be evaluated for different candidate transmit weight vectors. The candidate transmit weight vector that yields the smallest value for D(a) may be selected as follows:

$$\underline{a} = \underset{\underline{a}_i \in A}{\arg\min} \left\{ \sum_{k=1}^{K/2} \frac{1}{1 + S_x \cdot \underline{a}_i^H \cdot \underline{\Omega}(k) \cdot \underline{a}_i} \right\}, \quad \text{Eq (17)}$$

where A is the set of candidate transmit weight vectors, and $\underline{a}_i$ is the i-th candidate transmit weight vector in set A.

The objective function $J_h(\underline{a})$ in equation (16) is for the SNR metric shown in equation (14), which is applicable for the linear MMSE equalizer shown in FIGS. 2 and 4. In general, different objective functions may be derived for different receiver structures and different systems.

Figure 5:
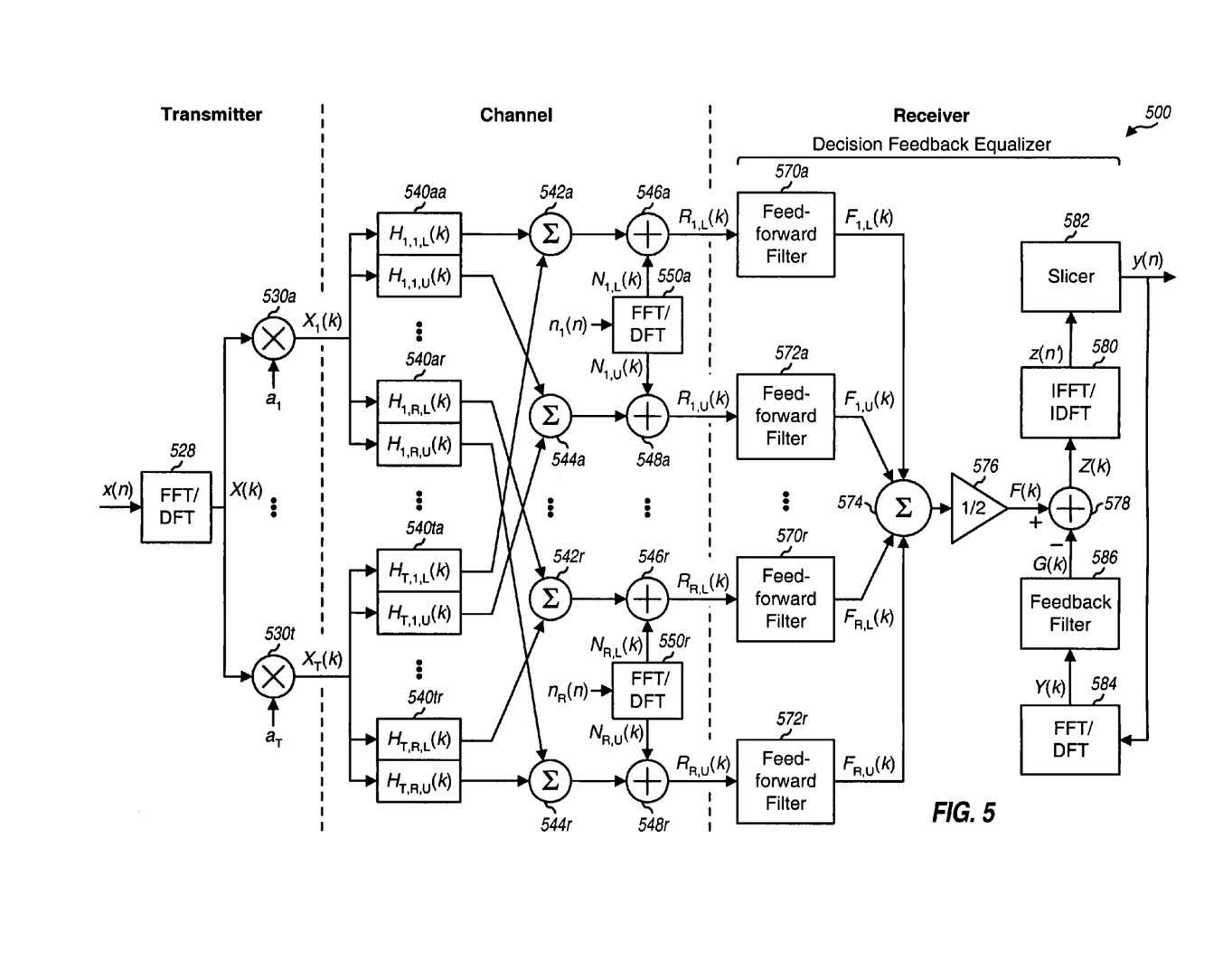
FIG. 5 shows a signal flow for a fractionally-spaced decision feedback equalizer.

FIG. 5 shows a frequency-domain signal flow 500 for a fractionally-spaced decision feedback equalizer (DFE). Signal flow 500 is a model of the processing for frequency-domain equalization with 2× oversampling.

For signal flow 500, at the transmitter, the transmit chips x(n) are transformed by FFT/DFT unit 528 and scaled with weights $a_1$ through $a_T$ by multipliers 530a through 530t, respectively, to obtain scaled transmit symbols $X_1(k)$ through $X_T(k)$ for the T transmit antennas. The scaled transmit symbols are sent from the T transmit antennas and via the communication channel to the R receive antennas. In an actual system, the transmitter sends the transmit chips x(n) to the receiver and does not perform any FFT/DFT. Instead, the front-end of the frequency domain equalizer in the receiver performs the FFT/DFT.

At the receiver, 2 R feed-forward filters 570a and 572a through 570r and 572r receive input symbols $R_{1,L}(k)$ and $R_{1,U}(k)$ through $R_{R,L}(k)$ and $R_{R,U}(k)$, respectively. Each of feed-forward filters 570 and 572 filters its input symbols with its filter response. The outputs all 2 R feed-forward filters 570 and 572 are summed by a summer 574 and scaled by ½ by a gain element 576 to obtain filtered symbols F(k). A summer 578 subtracts feedback symbols G(k) from the filtered symbols F(k) and provides equalized symbols Z(k). An IFFT/IDFT unit 580 transforms the equalized symbols to the time domain and provides equalized samples z(n) at the chip rate. A slicer 582 slices the equalized samples and provides output samples y(n). An FFT/DFT unit 584 transforms the output samples to the frequency domain and provides output symbols Y(k). A feedback filter 586 filters the output symbols with its filter response and provides the feedback symbols. The feed-forward and feedback filter responses may be derived in a manner known in the art.

The performance of a DFE, such as the one shown in FIG. 5, is dependent on the reliability of the output samples y(n), which are tentative decisions that are fed back for equalization. If the decisions are reliable, then intersymbol interference (ISI) may be accurately estimated and subtracted out, and good performance may be achieved. Decision errors result in an inaccurate estimate of the ISI and degraded performance.

An SNR metric for a DFE with negligible decision errors may be defined as:

$$SNR_g = \frac{1}{K/2} \cdot \sum_{k=1}^{K/2} \log_{10}[1 + S_x \cdot \underline{a}^H \cdot \underline{\Omega}(k) \cdot \underline{a}]. \quad \text{Eq (18)}$$

The SNR in equation (18) is given in units of decibel (dB) and is a geometric mean of the term $[1+S_x \cdot \underline{a}^H \cdot \underline{\Omega}(k) \cdot \underline{a}]$ for K/2 frequency bins. The geometric mean of $g_1, g_2, \ldots, g_K$ is given as: $(g_1 \cdot g_2 \cdots g_K)^{1/K}$ in linear unit, which is equal to $$\frac{1}{K} \cdot \sum_{i=1}^{K} \log g_i$$

in dB.

An objective function $J_g(\underline{a})$ may be defined for the SNR metric in equation (18), as follows:

$$J_g(\underline{a}) = \sum_{k=1}^{K} \log_{10}[1 + S_x \cdot \underline{a}^H \cdot \underline{\Omega}(k) \cdot \underline{a}] + \lambda \cdot (\underline{a}^H \cdot \underline{a} - 1). \quad \text{Eq (19)}$$

The SNR metric in equation (18) may be maximized by maximizing the objective function $J_g(\underline{a})$ in equation (19).

A DFE typically encounters some decision errors, which degrade performance. The SNR achieved by a DFE thus lies between the SNR metric with geometric mean in equation (18) and the SNR metric with harmonic mean in equation (14).

A system may utilize orthogonal frequency division multiplexing (OFDM), which partitions the overall system bandwidth into multiple (K) frequency bins. Each frequency bin is associated with a subcarrier that may be independently modulated with data. A receiver in an OFDM system typically performs equalization in the frequency domain for each of the K frequency bins. The OFDM receiver may derive equalizer coefficients for each frequency bin based on the MMSE technique, as shown in equation (4). However, there is only one signal copy from each receive antenna if null subcarriers are transmitted instead of redundant spectral signal components. In this case, $\underline{r}(k)$, $\underline{h}_r(k)$, $\underline{h}_{\mathit{eff}}(k)$, $\underline{n}(k)$, and $\underline{w}^H(k)$ are R×1 vectors, $\underline{H}(k)$ is an R×T matrix, and $\underline{R}(k)$ is an R×R matrix. The OFDM receiver may then perform equalization for each frequency bin as shown in equation (6).

The SNR metric in equation (18) and the objective function $J_g(\underline{a})$ in equation (19) may be used for an OFDM system if the receiver utilizes the MMSE technique. If the receiver utilizes zero-forcing or some other detection technique, then the SNR corresponding to frequency bin k may be smaller than $1+S_x \cdot \underline{a}^H \cdot \underline{\Omega}(k) \cdot \underline{a}$.

A receiver may be able to achieve an average SNR that is close to an arithmetic mean, which is the upper bound of a matched filter. An SNR metric may then be defined as follows:

$$SNR_a = \frac{1}{K/2} \cdot \sum_{k=1}^{K/2} S_x \cdot \underline{a}^H \cdot \underline{\Omega}(k) \cdot \underline{a}, \quad \text{Eq (20)}$$

$$= \frac{1}{K/2} \cdot S_x \cdot \underline{a}^H \cdot \left( \sum_{k=1}^{K/2} \underline{\Omega}(k) \right) \cdot \underline{a},$$

$$= \frac{1}{K/2} \cdot S_x \cdot \underline{a}^H \cdot \left( \sum_{k=1}^{K/2} \underline{H}^H(k) \cdot \underline{R}^{-1}(k) \cdot \underline{H}(k) \right) \cdot \underline{a}.$$

The SNR metric in equation (20) is an arithmetic mean of the term $[S_x \cdot \underline{a}^H \cdot \underline{\Omega}(k) \cdot \underline{a}]$ for K/2 frequency bins. The arithmetic mean of $g_1, g_2, \ldots, g_K$ is given as: $(g_1+g_2+\ldots+g_K)/K$.

An objective function $J_a(\underline{a})$ may be defined for the SNR metric in equation (20), as follows:

$$J_a(\underline{a}) = S_x \cdot \underline{a}^H \cdot \left( \sum_{k=1}^{K/2} \underline{H}^H(k) \cdot \underline{R}^{-1}(k) \cdot \underline{H}(k) \right) \cdot \underline{a} + \lambda \cdot (\underline{a}^H \cdot \underline{a} - 1). \quad \text{Eq (21)}$$

The SNR metric in equation (20) may be maximized by maximizing the objective function $J_a(\underline{a})$ in equation (21).

The solutions for the objective function $J_g(\underline{a})$ in equation (19) and the objective function $J_a(\underline{a})$ in equation (21) may be obtained by evaluating different candidate transmit weight vectors and selecting the candidate transmit weight vector that yields the largest value for the first term of $J_g(\underline{a})$ and $J_a(\underline{a})$, i.e., the term to the left of $\lambda \cdot (\underline{a}^H \cdot \underline{a} - 1)$. The selected transmit weight vector would then maximize the SNR metric, which in turn maximizes throughput. The solutions for the objective function $J_a(\underline{a})$ in equation (21) may also be obtained by determining the maximum (normalized) eigenvector of an R×R matrix $$\sum_{k=1}^{K/2} \underline{H}^H(k) \cdot \underline{R}^{-1}(k) \cdot \underline{H}(k).$$

The solutions for the objective functions may also be determined in other manners.

Some exemplary objective functions related to SNR have been described above. Other objective functions may also be defined and used for weight generation. In general, an objective function may quantify performance in terms of SNR, throughput, capacity, and/or other measures of performance. An objective function may also be a function of transmit antenna weights, channel estimates, noise estimate, and/or other quantities.

In general, an average SNR with arithmetic mean is more difficult to achieve than an average SNR with geometric mean, which is more difficult to achieve than an average SNR with harmonic mean. Different receiver structures may be able to achieve different SNRs. For example, a linear equalizer may be able to achieve an SNR that is close to an average SNR with harmonic mean. A DFE with negligible decision errors or an OFDM transceiver may be able to achieve an SNR that is close to an average SNR with geometric mean. Practical receivers may not achieve an SNR that is close to an average SNR with arithmetic mean in a frequency selective channel unless the operating data rate is strictly lower than the capacity of the channel.

A given receiver structure may also achieve different SNRs for different implementations. For example, a linear MMSE equalizer may be able to achieve an SNR that is higher than an SNR for a linear zero-forcing equalizer. A linear space-frequency equalizer that combines signal components across both space and frequency dimensions may be able to achieve a higher SNR than a linear equalizer that combines signal components across only spatial dimension. An MMSE DFE may also be able to achieve a higher SNR than a zero-forcing DFE.

A given receiver structure may also achieve different SNRs for different operating conditions. For example, a DFE with negligible decision errors may achieve an SNR that is close to an average SNR with geometric mean. A DFE with more decision errors may achieve an SNR that is closer to an average SNR with harmonic mean. Hence, a DFE may achieve different SNRs that fall between the geometric mean and the harmonic mean for different amounts of decision errors.

The transmit weight generation techniques have been described above for a receiver with multiple receive antennas and oversampling. The techniques may also be used for a receiver with a single antenna. In this case, R is equal to one for the equations above. The techniques may also be used for a receiver that samples the received signal(s) at chip rate, i.e., no oversampling. In this case, only one signal copy is available from each receive antenna, most of the vectors above are R×1 vectors, $\underline{H}(k)$ is an R×T matrix, and $\underline{R}(k)$ is an R×R matrix.

Figure 6:
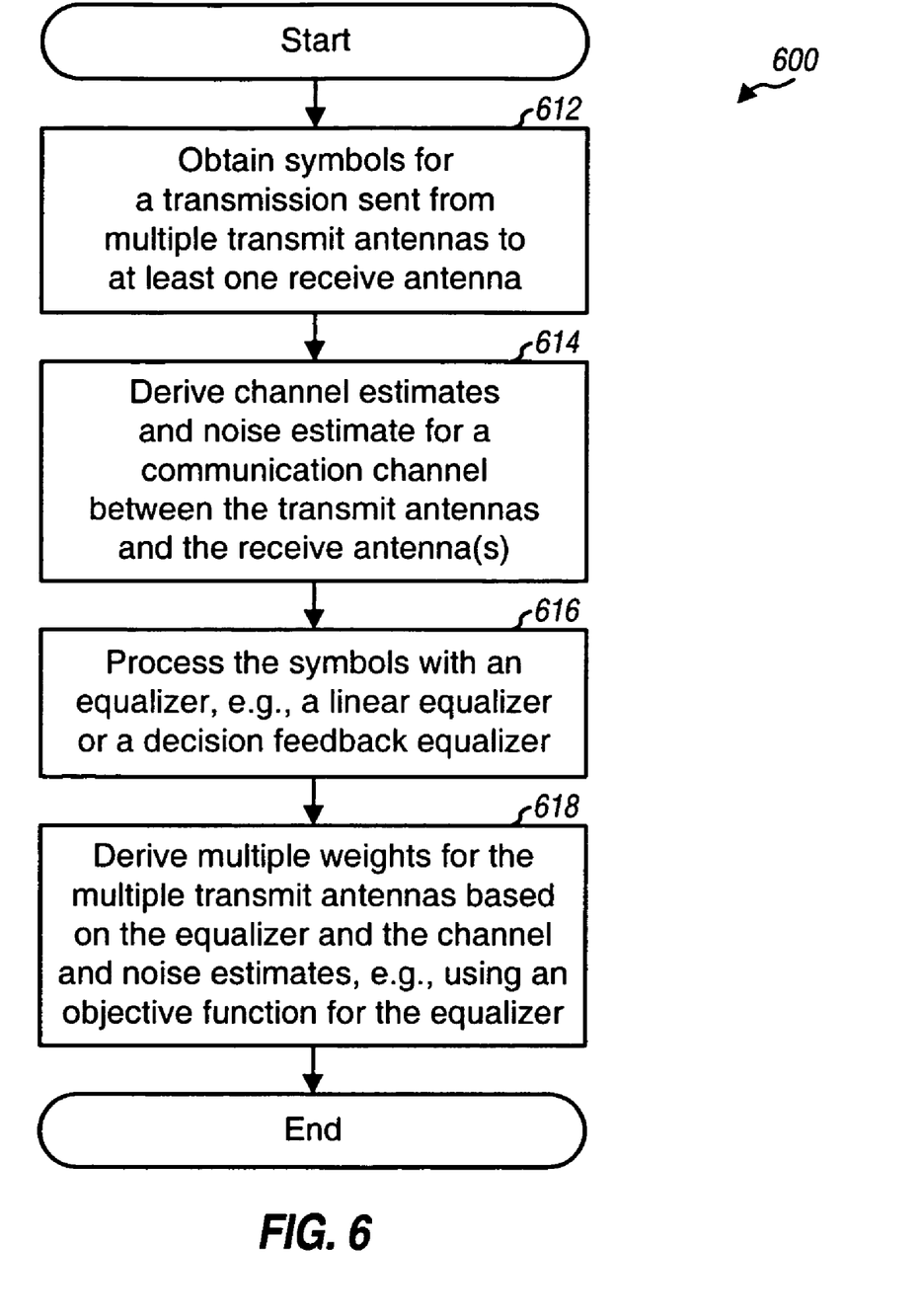
FIG. 6 shows a process for generating weights for transmit diversity.

FIG. 6 shows an embodiment of a process 600 for generating weights for transmit diversity. Symbols are obtained for a data transmission sent from multiple transmit antennas to at least one receive antenna (block 612). Channel estimates and noise estimate are derived for a communication channel between the multiple transmit antennas and the receive antenna(s) (block 614). The symbols are processed with an equalizer, e.g., a linear equalizer or a decision feedback equalizer (block 616). The equalization may be performed in the frequency domain, e.g., as shown in FIG. 4 or 5. Multiple weights for the multiple transmit antennas are derived based on the equalizer, the channel estimates, and the noise estimate (block 618).

For block 618, an objective function for the equalizer may be evaluated to derive the weights. The objective function may be related to an SNR metric for the equalizer. Different objective functions may be used for different equalizer structures such as a linear equalizer and a decision feedback equalizer. An equalizer of a given structure (e.g., a linear equalizer or a decision feedback equalizer) may also be of various types. For example, an equalizer may be a space-frequency equalizer, a spatial equalizer, a chip-spaced equalizer, a fractionally-spaced equalizer, an MMSE equalizer, a zero-forcing equalizer, and so on.

An appropriate objective function may be used for a given equalizer structure. For example, the objective function in equation (16) may be used for a linear equalizer, and the objective function in equation (19) may be used for a decision feedback equalizer. The term in the objective function may be defined in different manners for different types of equalizer. For example, the term $[1 + S_x \cdot \underline{a}^H \cdot \underline{\Omega}(k) \cdot \underline{a}]$ for the objective function in equation (16) may be defined in different manners for the MMSE and zero-forcing equalizers. The vectors and matrices in the objective function may also have different dimensions depending on the number of receive antennas and the oversampling ratio.

The transmit weight generation techniques described herein may be used for various communication systems such as a Code Division Multiple Access (CDMA) system, a Time Division Multiple Access (TDMA) system, a Frequency Division Multiple Access (FDMA) system, an orthogonal frequency division multiple access (OFDMA) system, a single-carrier FDMA (SC-FDMA) system, and so on. A CDMA system may implement one or more radio access technologies (RATs) such as Wideband-CDMA (W-CDMA), cdma2000, and so on. cdma2000 covers IS-2000, IS-856, and IS-95 standards. A TDMA system may implement a RAT such as Global System for Mobile Communications (GSM). These various RATs and standards are known in the art. An OFDMA system transmits modulation symbols in the frequency domain on orthogonal frequency subcarriers using OFDM. An SC-FDMA system transmits modulation symbols in the time domain on orthogonal frequency subcarrier.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
   at least one processor to obtain channel estimates for a communication channel between multiple transmit antennas and at least one receive antenna, and to derive multiple weights for the multiple transmit antennas based on the channel estimates and an equalizer used for a data transmission from the multiple transmit antennas to the at least one receive antenna; and
   a memory coupled to the at least one processor,
   wherein the at least one processor derives the multiple weights based on an objective function for the equalizer.

2. The apparatus of claim 1, wherein the objective function is related to a signal-to-noise ratio (SNR) achievable by the equalizer.

3. The apparatus of claim 1, wherein the objective function is a function of the multiple weights and the channel estimates.

4. The apparatus of claim 1, wherein the objective function is a function of the multiple weights, the channel estimates, and a noise estimate.

5. The apparatus of claim 1, wherein the objective function describes an average signal-to-noise ratio (SNR) with harmonic mean.

6. The apparatus of claim 1, wherein the objective function describes an average signal-to-noise ratio (SNR) with geometric mean.

7. The apparatus of claim 1, wherein the objective function describes an average signal-to-noise ratio (SNR) with arithmetic mean.

8. The apparatus of claim 1, wherein the equalizer is a linear equalizer and the objective function describes an average signal-to-noise ratio (SNR) with harmonic mean.

9. The apparatus of claim 1, wherein the equalizer is a decision feedback equalizer and the objective function describes an average signal-to-noise ratio (SNR) with geometric mean.

10. The apparatus of claim 1, wherein the data transmission is sent using orthogonal frequency division multiplexing (OFDM), and wherein the objective function describes an average signal-to-noise ratio (SNR) with geometric mean.

11. An apparatus comprising:
    at least one processor to obtain channel estimates for a communication channel between multiple transmit antennas and at least one receive antenna, and to derive multiple weights for the multiple transmit antennas based on the channel estimates and an equalizer used for a data transmission from the multiple transmit antennas to the at least one receive antenna; and
    a memory coupled to the at least one processor,
    wherein the at least one processor derives equalizer coefficients for multiple signal copies obtained from the at least one receive antenna and oversampling, and performs equalization with the equalizer coefficients to combine the multiple signal copies.

12. An apparatus comprising:
    at least one processor to obtain channel estimates for a communication channel between multiple transmit antennas and at least one receive antenna, and to derive multiple weights for the multiple transmit antennas based on the channel estimates and an equalizer used for a data transmission from the multiple transmit antennas to the at least one receive antenna; and
    a memory coupled to the at least one processor,
    wherein the at least one processor evaluates each of multiple sets of weights and provides a set of weights with best performance as the multiple weights for the multiple transmit antennas.

13. An apparatus comprising:
    at least one processor to obtain channel estimates for a communication channel between multiple transmit antennas and at least one receive antenna, and to derive multiple weights for the multiple transmit antennas based on the channel estimates and an equalizer used for a data transmission from the multiple transmit antennas to the at least one receive antenna; and a memory coupled to the at least one processor, wherein the at least one processor sends the multiple weights to a transmitter to apply on the multiple transmit antennas.

14. A method comprising:

obtaining channel estimates for a communication channel between multiple transmit antennas and at least one receive antenna; and deriving multiple weights for the multiple transmit antennas based on the channel estimates and an equalizer used for a data transmission from the multiple transmit antennas to the at least one receive antenna, wherein the deriving the multiple weights comprises deriving the multiple weights based on an objective function for the equalizer and indicative of a signal-to-noise ratio (SNR) achievable by the equalizer.

15. A method comprising:

obtaining channel estimates for a communication channel between multiple transmit antennas and at least one receive antenna; and deriving multiple weights for the multiple transmit antennas based on the channel estimates and an equalizer used for a data transmission from the multiple transmit antennas to the at least one receive antenna, wherein the deriving the multiple weights comprises evaluating each of multiple sets of weights, and providing a set of weights with best performance as the multiple weights for the multiple transmit antennas.

16. An apparatus comprising:

means for obtaining channel estimates for a communication channel between multiple transmit antennas and at least one receive antenna; and means for deriving multiple weights for the multiple transmit antennas based on the channel estimates and an equalizer used for a data transmission from the multiple transmit antennas to the at least one receive antenna, wherein the means for deriving the multiple weights comprises means for deriving the multiple weights based on an objective function for the equalizer and indicative of a signal-to-noise ratio (SNR) achievable by the equalizer.

17. An apparatus comprising:

means for obtaining channel estimates for a communication channel between multiple transmit antennas and at least one receive antenna; and means for deriving multiple weights for the multiple transmit antennas based on the channel estimates and an equalizer used for a data transmission from the multiple transmit antennas to the at least one receive antenna, wherein the means for deriving the multiple weights comprises means for evaluating each of multiple sets of weights, and means for providing a set of weights with best performance as the multiple weights for the multiple transmit antennas.

18. An apparatus comprising:

at least one processor to obtain symbols for a data transmission sent from multiple transmit antennas to at least one receive antenna, to process the symbols in frequency domain, and to derive multiple weights for the multiple transmit antennas; and a memory coupled to the at least one processor, wherein the at least one processor derives equalizer coefficients for multiple signal copies obtained from the at least one receive antenna and oversampling, and performs equalization on the symbols with the equalizer coefficients to combine the multiple signal copies.

19. A method comprising:

obtaining symbols for a data transmission sent from multiple transmit antennas to at least one receive antenna;

processing the symbols in frequency domain; and deriving multiple weights for the multiple transmit antennas, wherein the deriving the multiple weights comprises deriving the multiple weights based on an objective function for the equalizer.

20. An apparatus comprising:

means for obtaining symbols for a data transmission sent from multiple transmit antennas to at least one receive antenna;

means for processing the symbols in frequency domain; and means for deriving multiple weights for the multiple transmit antennas, wherein the means for deriving the multiple weights comprises means for deriving the multiple weights based on an objective function for the equalizer.

* * * * *